United States Patent
Shastry et al.

(10) Patent No.: US 7,874,703 B2
(45) Date of Patent: Jan. 25, 2011

(54) TOTAL INTERNAL REFLECTION LENS WITH BASE

(75) Inventors: Chakrakodi Vishnu Shastry, Princeton, NJ (US); David Weimer, Tuckerton, NJ (US); Gordon Routledge, Bradley (GB); Samual David Boege, Point Pleasant, NJ (US); William S. Leib, III, Tinton Falls, NJ (US); Anthony Verdes, Brick, NJ (US)

(73) Assignee: Dialight Corporation, Farmingdale, NJ (US)

( * ) Notice: Subject to any disclaimer, the term of this patent is extended or adjusted under 35 U.S.C. 154(b) by 210 days.

(21) Appl. No.: 12/200,280

(22) Filed: Aug. 28, 2008

(65) Prior Publication Data

US 2010/0053973 A1 Mar. 4, 2010

(51) Int. Cl.
*F21V 33/00* (2006.01)

(52) U.S. Cl. .................................. 362/311.02; 362/800

(58) Field of Classification Search ............. 362/311.02
See application file for complete search history.

(56) References Cited

U.S. PATENT DOCUMENTS

| | | | |
|---|---|---|---|
| 5,526,190 A | 6/1996 | Hubble et al. | |
| 7,172,319 B2 | 2/2007 | Holder et al. | |
| 2003/0137838 A1* | 7/2003 | Rizkin et al. | 362/240 |
| 2006/0291245 A1* | 12/2006 | Shimada | 362/612 |
| 2008/0130137 A1 | 6/2008 | Angelini et al. | |

FOREIGN PATENT DOCUMENTS

| | | | |
|---|---|---|---|
| TW | 238542 B | * | 8/2005 |
| WO | WO 2006/109113 | * | 10/2006 |

OTHER PUBLICATIONS

International Search Report and Written Opinion for PCT/US2009/055176, Oct. 20, 2009.

* cited by examiner

*Primary Examiner*—Laura Tso

(57) ABSTRACT

The present invention relates generally to a light transmitting device and a total internal reflection lens with base. In one embodiment, the total internal reflection lens includes a light output portion and a first base coupled to the light output portion. The first base includes a cavity for receiving a light emitting diode (LED) and an undercut adjacent to the cavity.

18 Claims, 3 Drawing Sheets

TOTAL INTERNAL REFLECTION LENS WITH BASE

FIELD OF THE INVENTION

The present invention relates generally to total internal reflection lenses.

BACKGROUND OF THE INVENTION

Light coming from a light emitting diode (LED) source is managed and modified using lenses using refraction and total internal reflection (TIR). These lenses have to be mounted over the LED, while still maintaining a distance of the LED and the lens as per an optical design. One of the ways to mount the LED is by attaching a base to the lens, which is then attached to the LED.

The base of the lens is manufactured with a certain thickness. If the thickness of the base is greater than the thickness of the base of the LED, then the base is attached higher with respect to the lens. This changes the optical design, since a portion of the base of the lens is in the optical path of the light rays emitted from the LED. The light instead of being totally internally reflected in this area, leaks out of the side of the lens through the base. This impacts both a viewing angle and a uniformity of the light beam.

SUMMARY OF THE INVENTION

In one embodiment, the present invention is directed towards a light transmitting device and a total internal reflection lens with base. In one embodiment, total internal reflection lens includes a light output portion and a first base coupled to said light output portion. The first base includes a cavity for receiving a light emitting diode (LED) and an undercut adjacent to said cavity.

In one embodiment, the present invention also provides a light transmitting device. In one embodiment, the light transmitting device comprises a total internal reflection lens having an undercut and a light emitting diode (LED) coupled to said total internal reflection lens.

In one embodiment, the present invention provides a method for providing a light transmitting device. The method comprises providing a total internal reflection lens comprising a light output portion and a base, creating a cavity in said base, forming an undercut in said base adjacent to said cavity and coupling a light emitting diode (LED) to said total internal reflection lens and within said cavity of said base.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
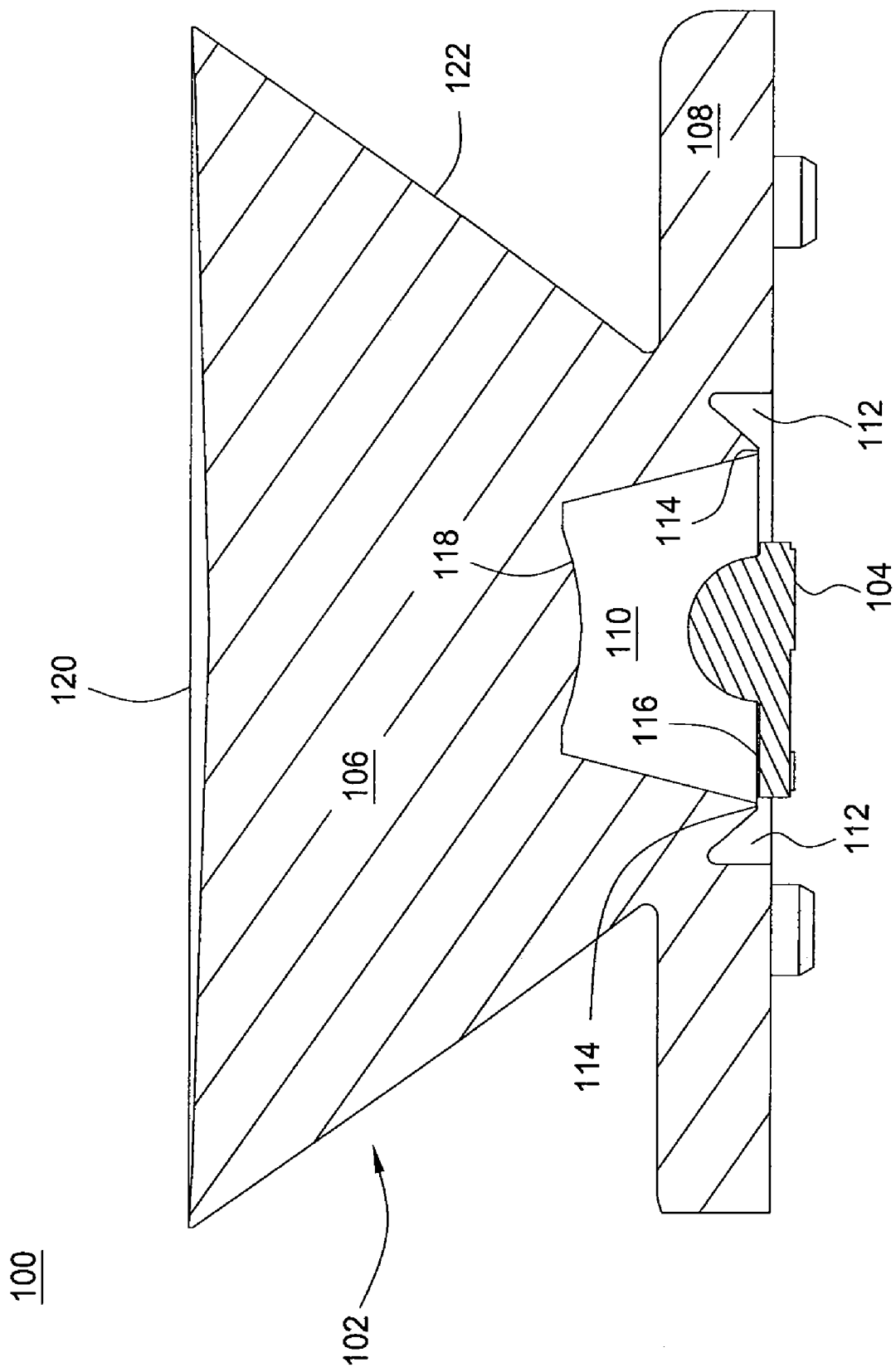
FIG. 1 depicts a cutaway view of an exemplary embodiment of a total internal reflection lens.

FIG. 1 illustrates a cutaway view of an exemplary light transmitting device 100 of the present invention. The light transmitting device 100 comprises a total internal reflection (TIR) lens 102 and a light emitting diode (LED) 104.

In one embodiment, the TIR lens 102 comprises a light output portion 106 and a base 108. The light output portion 106 comprises a top surface 120 and one or more side surfaces 122. For example, if the light output portion 106 is a cylindrical shape, the light output portion 106 may have one side surface 122. However, if the light output portion 106 is a polygon, the light output portion 106 may have one or more side surfaces 122.

In one embodiment, the light output portion 106 of the TIR lens 102 reflects light from the LED 104 off of the one or more side surfaces 122. Subsequently, the light from the LED 104 is refracted out through the top surface 120 of the light output portion 106.

The TIR lens 102 may be cut, fabricated or molded from any material that is appropriate for optical applications. For example, the TIR lens 102 may be cut, fabricated or molded from any optical grade polymer based materials. In one embodiment, the TIR lens 102 may be fabricated from polycarbonate.

The base 108 comprises a cavity 110. The LED 104 may be coupled to the TIR lens 102 such that the LED 104 is within the cavity 110. The cavity 110 may be molded or fabricated in any shape that is appropriate for any particular application. In one embodiment, the shape of the cavity 110 may be a function of required collection angles for light emitted from the LED 104 to achieve TIR.

A distance between the LED 104 and a top surface 118 of the cavity 110 may be a function of desired optical properties for a particular application. Moreover, the top surface 118 of the cavity 110 may be flat, inwardly curved or outwardly curved depending on the desired optical properties. In an exemplary embodiment illustrated in FIG. 1, the top surface 118 of the cavity 110 is outwardly curved to direct the light in a desired direction. For example, a wide angle beam spread may be desired or a narrow angle beam spread may be desired.

The base 108 also comprises an undercut 112. The undercut 112 is adjacent to the cavity 110. The undercut 112 and the cavity 110 form an inner member having a bottom edge 114. In one embodiment, the LED 104 may be placed into the cavity 110 until the bottom edge 114 is in contact with a top portion of a base 116 of the LED 104.

In one embodiment, the undercut 112 allows all or substantially all light emitted by the LED 104 that was previously lost through the base 108 to be totally internally reflected. In other words, light emitted by the LED 104 towards the base 108 may be re-directed to achieve total internal reflection of substantially all light emitted from the LED 104 towards the base 108. Without the undercut 112, the light emitted from the LED 104 towards the base would be lost through the base 108. That is, the undercut 112 allows the TIR lens 102 to achieve total internal reflection of all or substantially all light emitted by the LED 104 such that a minimal amount of light is lost through the base 108.

The undercut 112 allows all or substantially all light emitted by the LED 104, including the light directed towards the base 108, to be re-directed through the top surface 120 of the light output portion 106 of the TIR lens 102. Consequently, the undercut 112 allows all or substantially all light emitted from LED 104 to be totally internally reflected without losing light emitted from the LED 104 through the base 108.

Without the undercut 112, some light emitted by the LED 104 would be lost through the base 108. As a result, a viewing angle and uniformity of a light beam emitted by the LED 104 was affected. The undercut 112 introduces a surface with proper collection angles that reclaims the light previously lost through the base 108.

The undercut 112 may be in any shape, size or depth that achieves total internal reflection of the light emitted by the LED 104 towards the base 108. Moreover, those skilled in the art will recognize that the further in or up from a bottom of the base 108 the undercut 112 is made, the greater improvement in achieving TIR will be observed. Forming any amount of undercut 112 from the bottom of the base 108 in or up to the top of the LED 104 is within the scope of the present invention. That is, a minimal depth of the undercut 112 will have minimal improvement up to a maximum depth of the undercut 112 to the top of the LED 104 will have a maximum improvement.

In one exemplary embodiment, the undercut 112 is in the shape of a conic substantially similar to a conic shape of the light output portion 106. The angle of the undercut 112 is such that is at substantially the same angle as the edge of the conic shape of the light output portion 106. However, one skilled in the art will recognize that the undercut 112 and the light output portion 106 may be in any shape depending on optical design parameters or what application the light transmitting device 100 will be used for as long as the undercut 112 achieves total internal reflection of light emitted from the LED 104 towards the base 108 and prevents light from being lost through the base 108.

In one embodiment, the light output portion 106, the base 108, the cavity 110 and the undercut 112 may be injection molded as a single piece. As a result, the total internal reflection lens 102 provides greater manufacturing efficiency and cost savings. However, those skilled in the art will recognize that the one or more components or features of the light output portion 106, the base 108, the cavity 110 and the undercut 112 may be coupled together by one or more separate pieces and is within the scope of the present invention.

Figure 2:
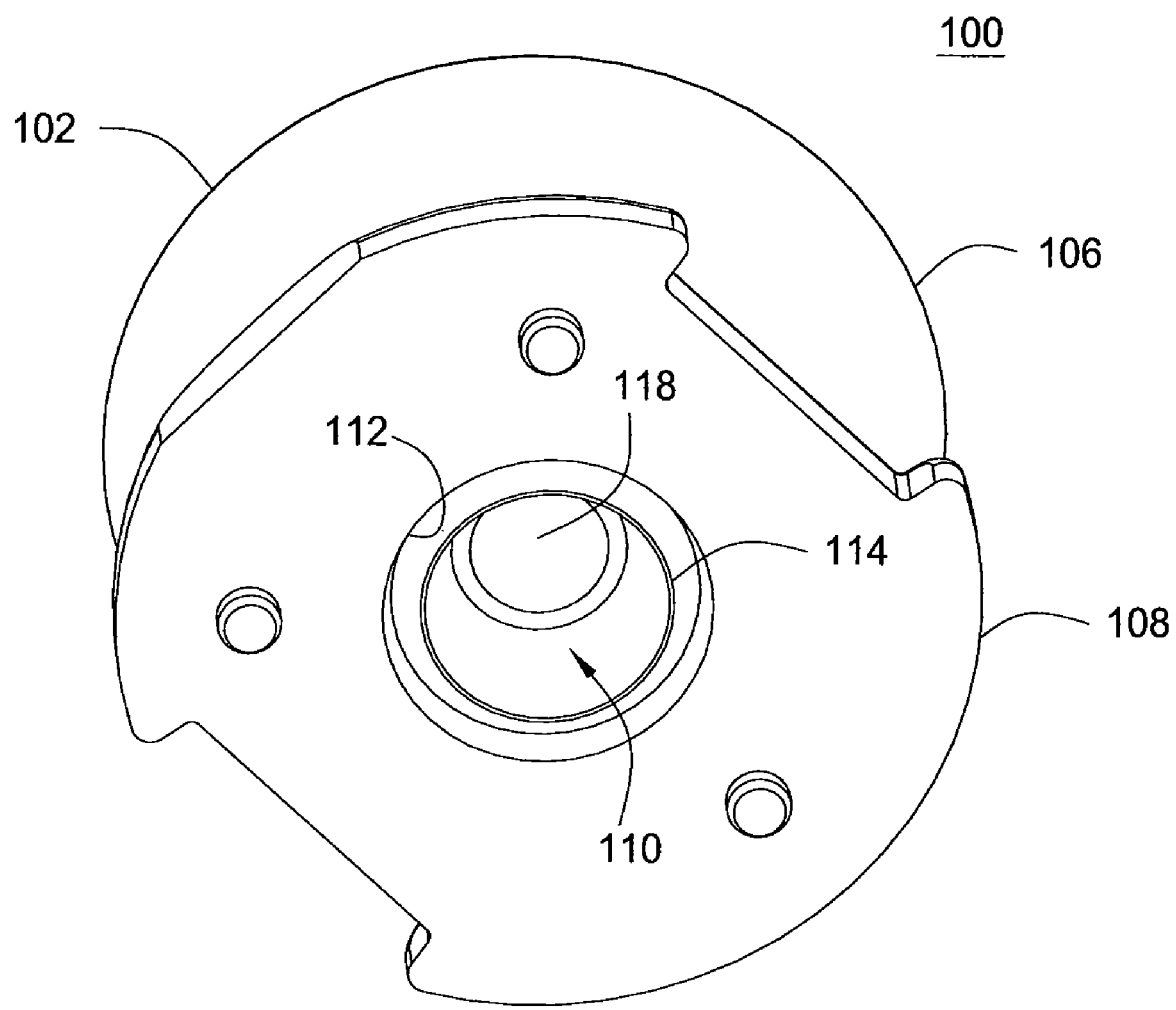
FIG. 2 depicts an isometric bottom view of one embodiment of the total internal reflection lens.

FIG. 2 illustrates an isometric view of an exemplary light transmitting device 100. As illustrated by FIG. 2, in one embodiment, the light transmitting device 100 comprises a TIR lens 102 comprising a light output portion 106 in a conic shape and a base 108. FIG. 2 illustrates an isometric view of the cavity 110, the top surface 118 of the cavity 110, the undercut 112 and the bottom edge 114.

As discussed above, the undercut 112 may be in substantially the same shape and/or angle as the light output portion 106 of the total internal reflection lens 102. Thus, in one embodiment when the light output portion 106 is a conic shape, FIG. 2 illustrates the undercut 112 also being a conic shape. Moreover, the conic shape of the undercut 112 lies on substantially the same plane and at substantially the same angle as the conic shape of the light output portion 106. In other words, the conic shape of the undercut 112 appears to be a continuation of the conic shape of the light output portion 106.

In one embodiment, the cavity 110 may receive an LED, for example LED 104. The bottom edge 114 may be coupled to a base 116 of the LED 104, as illustrated in FIG. 1. The design of the undercut 112 prevents all or substantially all light emitted from the LED 104 towards the base 108 from being lost through the base 108. Rather, the undercut 112 reclaims the light such that any light from the LED 104 that was previously lost through the base 108 is totally internally reflected through the top surface 120 of the light output portion 106 of the TIR lens 102, as discussed above. Consequently, all or substantially all of the light emitted from the LED 104 is totally internally reflected through the TIR lens 102 and a minimal amount of light is lost through the base 108.

Figure 3:
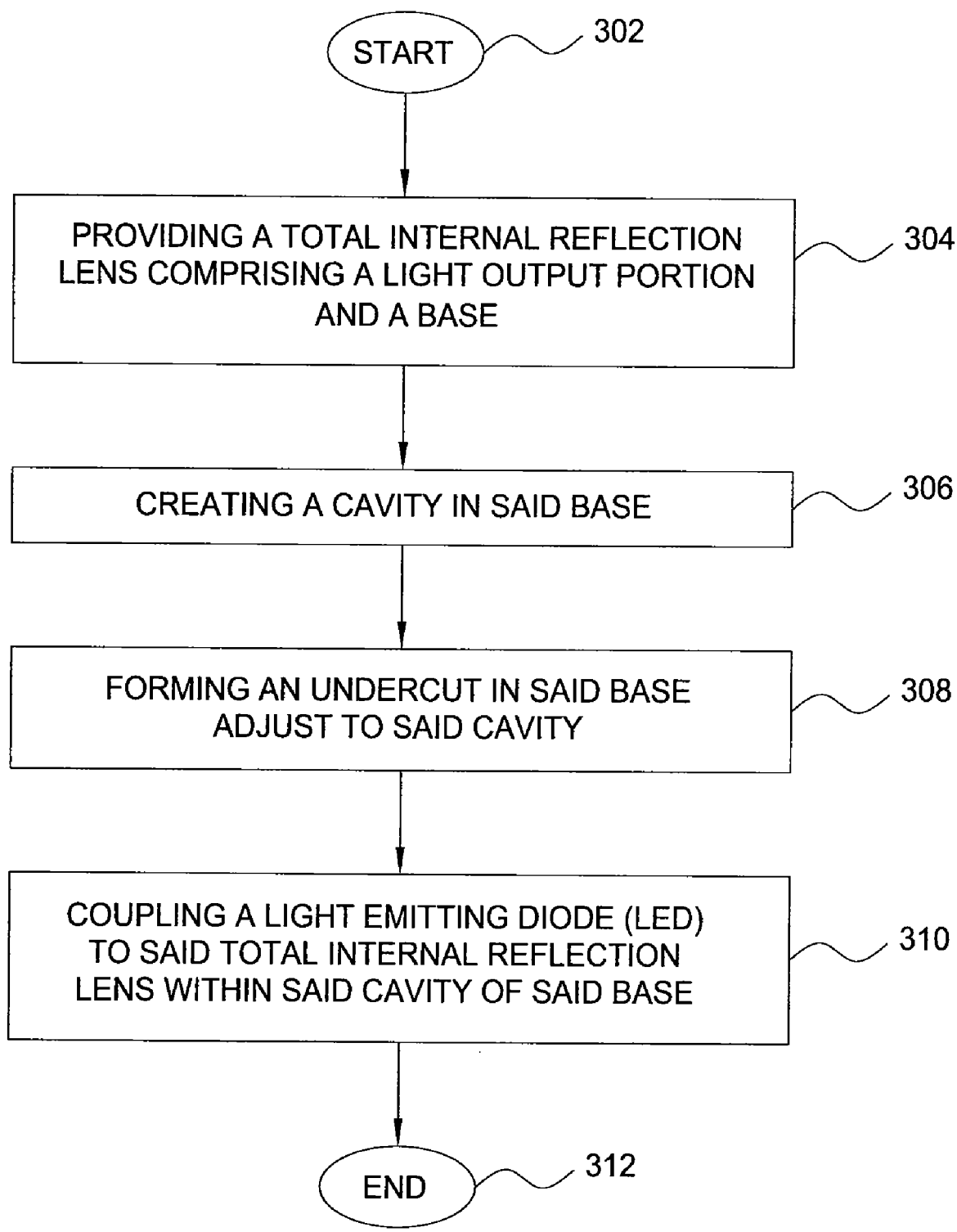
FIG. 3 depicts a flowchart for one embodiment of a method for providing a light transmitting device.

FIG. 3 illustrates a method 300 for providing a light transmitting device 100. The method begins at step 302. At step 304, the method 300 provides a total internal reflection lens 102 comprising a light output portion 106 and a base 108.

At step 306, the method 300 creates a cavity 110 in the base 108.

At step 308, the method 300 forms an undercut 112 in the base adjacent to the cavity 110. As discussed above, the undercut 112 and the cavity 110 may form a bottom edge 114 that may be coupled to a light emitting diode (LED).

At step 310, the method 300 couples an LED 104 to the TIR lens 102 within the cavity 110 of the base 108. As discussed above, the undercut 112 achieves total internal reflection of light emitted by the LED 104 towards the base 108 that was previously lost through base 108. In other words, the undercut 112 helps to "reclaim" light that was previously lost through the base 108. The undercut 112 may be in a shape that is substantially the same as a shape of the light output portion 106 of the TIR lens 102.

In one embodiment, the light output portion 106, the base 108, the cavity 110 and the undercut 112 may be injection molded as a single piece. However as noted above, those skilled in the art will recognize that the one or more components or features of the light output portion 106, the base 108, the cavity 110 and the undercut 112 may be coupled together by one or more separate pieces and is within the scope of the present invention. The method 300 concludes with step 312.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A total internal reflection lens, comprising:
   a light output portion; and
   a first base coupled to said light output portion, wherein said first base comprises:
      a cavity for receiving a light emitting diode (LED); and
      an undercut adjacent to said cavity, wherein said undercut forms an inner member of said first base that is a substantially same shape as said light output portion.

2. The total internal reflection lens of claim 1, wherein said undercut penetrates said first base at least above a top plane of a second base of said LED.

3. The total internal reflection lens of claim 1, wherein said undercut forms a bottom edge that is on a same plane as a top plane of a second base of said LED.

4. The total internal reflection lens of claim 1, wherein said undercut achieves total internal reflection of substantially all light emitted from said LED directed towards said first base.

5. The total internal reflection lens of claim 1, wherein said undercut prevents light emitted from said LED from being lost through said first base.

6. The total internal reflection lens of claim 1, wherein said undercut re-directs substantially all light emitted from said LED through said light output portion.

7. The total internal reflection lens of claim 1, wherein said total internal reflection lens is molded as a single piece.

8. A light transmitting device, comprising:
   a total internal reflection lens having an undercut, wherein said undercut forms an inner member of a first base that is a substantially same shape as a light output portion of the total internal reflection lens; and a light emitting diode (LED) coupled to said total internal reflection lens.

9. The light transmitting device of claim 8, wherein said total internal reflection lens comprises:
   the light output portion; and
   the first base, wherein said first base comprises:
   a cavity for receiving said LED adjacent to said undercut located in said first base.

10. The light transmitting device of claim 8, wherein said undercut penetrates the first base of said total internal reflection lens at least above a top plane of a second base of said LED.

11. The light transmitting device of claim 8, wherein said undercut forms a bottom edge in the first base of said total internal reflection lens that is on a same plane as a top plane of a second base of said LED.

12. The light transmitting device of claim 8, wherein said undercut achieves total internal reflection of substantially all light emitted from said LED towards the first base of the total internal reflection lens.

13. The light transmitting device of claim 8, wherein said undercut prevents light emitted from said LED from being lost through the first base of said total internal reflection lens.

14. The light transmitting device of claim 8, wherein said undercut re-directs substantially all light emitted from said LED through the light output portion of said total internal reflection lens.

15. The total internal reflection lens of claim 8, wherein said total internal reflection lens is molded as a single piece.

16. A method for providing a light transmitting device, comprising:
   providing a total internal reflection lens comprising a light output portion and a base;
   creating a cavity in said base;
   forming an undercut in said base adjacent to said cavity, wherein said undercut forms an inner member of the base of the total internal reflection lens that is a substantially same shape as the light output portion; and
   coupling a light emitting diode (LED) to said total internal reflection lens within said cavity of said base.

17. The method of claim 16, wherein said undercut re-directs substantially all light emitted from said LED through said light output portion.

18. The method of claim 16, wherein said total internal reflection lens, said cavity in said base and said undercut are molded as a single piece.

* * * * *

UNITED STATES PATENT AND TRADEMARK OFFICE
CERTIFICATE OF CORRECTION

| | | |
|---|---|---|
| PATENT NO. | : 7,874,703 B2 | Page 1 of 1 |
| APPLICATION NO. | : 12/200280 | |
| DATED | : January 25, 2011 | |
| INVENTOR(S) | : Chakrakodi Vishnu Shastry et al. | |

It is certified that error appears in the above-identified patent and that said Letters Patent is hereby corrected as shown below:

In the Claims:

Column 6, line 5, in Claim 15, delete "total internal reflection lens" and insert --light transmitting device-- therefor.

Signed and Sealed this
Twenty-ninth Day of July, 2014

Michelle K. Lee
*Deputy Director of the United States Patent and Trademark Office*